United States Patent
Hsia (10) Patent No.: US 10,136,483 B2
(45) Date of Patent: Nov. 20, 2018

(54) SOLID-STATE LIGHTING WITH AUTO-SELECT SETTINGS FOR LINE VOLTAGE AND BALLAST VOLTAGE

(71) Applicant: Aleddra Inc., Renton, WA (US)

(72) Inventor: Chungho Hsia, Bellevue, WA (US)

(73) Assignee: ALEDDRA INC., Renton, WA (US)

(*) Notice: Subject to any disclaimer, the term of this patent is extended or adjusted under 35 U.S.C. 154(b) by 0 days.

(21) Appl. No.: 15/911,086

(22) Filed: Mar. 3, 2018

(65) Prior Publication Data
US 2018/0192488 A1 Jul. 5, 2018

Related U.S. Application Data

(63) Continuation-in-part of application No. 15/897,106, filed on Feb. 14, 2018, which is a continuation-in-part of application No. 15/874,752, filed on Jan. 18, 2018, now Pat. No. 10,036,515, which is a continuation-in-part of application No. 15/836,170, filed on Dec. 8, 2017, now Pat. No. 10,021,753, which is a continuation-in-part of application No. 15/649,392, filed on Jul. 13, 2017, now Pat. No. 9,986,619, which is a continuation-in-part of
(Continued)

(51) Int. Cl.
| | |
|---|---|
| H05B 33/08 | (2006.01) |
| F21V 23/06 | (2006.01) |
| F21K 9/278 | (2016.01) |
| F21Y 103/10 | (2016.01) |
| F21Y 115/10 | (2016.01) |

(52) U.S. Cl.
CPC ......... *H05B 33/0815* (2013.01); *F21K 9/278* (2016.08); *F21V 23/06* (2013.01); *H05B 33/089* (2013.01); *H05B 33/0845* (2013.01); *F21Y 2103/10* (2016.08); *F21Y 2115/10* (2016.08)

(58) Field of Classification Search
None
See application file for complete search history.

(56) References Cited

U.S. PATENT DOCUMENTS

8,896,207 B2* 11/2014 Thomas ............. H05B 33/0809
315/185 R
9,686,835 B2* 6/2017 Park .................. H05B 33/0806
(Continued)

*Primary Examiner* — Minh D A
*Assistant Examiner* — James H Cho
(74) *Attorney, Agent, or Firm* — Han IP PLLC; Andy M. Han (57) ABSTRACT

An LED lamp, comprising a first full-wave rectifier, a ballast operation circuit, an LED driving circuit, LED array(s), and an optocoupler, replaces a fluorescent tube or a conventional LED tube lamp in lamp fixture sockets that are wired to connect to either AC mains or a ballast. The ballast operation circuit, comprising two frequency sensitive devices, a second full-wave rectifier, and two or more diodes connected in series, auto-selects an input AC voltage to operate the LED lamp without ambiguity and safety issues. When the input AC voltage is from the ballast, the optocoupler is enabled to disable the LED driving circuit, whereas the LED array(s) are powered by the second full-wave rectifier. When the input AC voltage is from the AC mains, the optocoupler is disabled to maneuver the LED driving circuit, whereas the LED array(s) are operated by the LED driving circuit, pre-powered by the first full-wave rectifier.

15 Claims, 4 Drawing Sheets

Related U.S. Application Data application No. 15/444,536, filed on Feb. 28, 2017, now Pat. No. 9,826,595, which is a continuation-in-part of application No. 15/362,772, filed on Nov. 28, 2016, now Pat. No. 9,967,927, which is a continuation-in-part of application No. 15/225,748, filed on Aug. 1, 2016, now Pat. No. 9,743,484, which is a continuation-in-part of application No. 14/818,041, filed on Aug. 4, 2015, now Pat. No. 9,420,663, which is a continuation-in-part of application No. 14/688,841, filed on Apr. 16, 2015, now Pat. No. 9,288,867, which is a continuation-in-part of application No. 14/465,174, filed on Aug. 21, 2014, now Pat. No. 9,277,603, which is a continuation-in-part of application No. 14/135,116, filed on Dec. 19, 2013, now Pat. No. 9,163,818, which is a continuation-in-part of application No. 13/525,249, filed on Jun. 15, 2012, now Pat. No. 8,749,167.

(56) References Cited

U.S. PATENT DOCUMENTS

| | | | |
|---|---|---|---|
| 2014/0152184 A1* | 6/2014 | Tomiyama | H05B 33/0818 315/186 |
| 2014/0265900 A1* | 9/2014 | Sadwick | H05B 33/0803 315/200 R |
| 2015/0181661 A1* | 6/2015 | Hsia | F21V 25/04 315/160 |

* cited by examiner

SOLID-STATE LIGHTING WITH AUTO-SELECT SETTINGS FOR LINE VOLTAGE AND BALLAST VOLTAGE

CROSS-REFERENCE TO RELATED APPLICATIONS

The present disclosure is part of a continuation-in-part (CIP) application of U.S. patent application Ser. No. 15/897,106, filed 14 Feb. 2018 which is a CIP application of U.S. patent application Ser. No. 15/874,752, filed 18 Jan. 2018, which is a CIP application of U.S. patent application Ser. No. 15/836,170, filed 8 Dec. 2017, which is a CIP application of U.S. patent application of Ser. No. 15/649,392 filed 13 Jul. 2017, which is a CIP application of U.S. patent application Ser. No. 15/444,536, filed 28 Feb. 2017 and issued as U.S. Pat. No. 9,826,595 on 21 Nov. 2017, which is a CIP application of U.S. patent application Ser. No. 15/362,772, filed 28 Nov. 2016, which is a CIP application of U.S. patent application Ser. No. 15/225,748, filed 1 Aug. 2016 and issued as U.S. Pat. No. 9,743,484 on 22 Aug. 2017, which is a CIP application of U.S. patent application Ser. No. 14/818,041, filed 4 Aug. 2015 and issued as U.S. Pat. No. 9,420,663 on 16 Aug. 2016, which is a CIP application of U.S. patent application Ser. No. 14/688,841, filed 16 Apr. 2015 and issued as U.S. Pat. No. 9,288,867 on 15 Mar. 2016, which is a CIP application of U.S. patent application Ser. No. 14/465,174, filed 21 Aug. 2014 and issued as U.S. Pat. No. 9,277,603 on 1 Mar. 2016, which is a CIP application of U.S. patent application Ser. No. 14/135,116, filed 19 Dec. 2013 and issued as U.S. Pat. No. 9,163,818 on 20 Oct. 2015, which is a CIP application of U.S. patent application Ser. No. 13/525,249, filed 15 Jun. 2012 and issued as U.S. Pat. No. 8,749,167 on 10 Jun. 2014. Contents of the above-identified applications are incorporated herein by reference in their entirety.

BACKGROUND

Technical Field

The present disclosure relates to light-emitting diode (LED) lamps and more particularly to an LED lamp with auto-select settings for either a line voltage or a ballast voltage to operate the LED lamp without ambiguity.

Description of the Related Art

Solid-state lighting from semiconductor light-emitting diodes (LEDs) has received much attention in general lighting applications today. Because of its potential for more energy savings, better environmental protection (with no hazardous materials used), higher efficiency, smaller size, and longer lifetime than conventional incandescent bulbs and fluorescent tubes, the LED-based solid-state lighting will be a mainstream for general lighting in the near future. Meanwhile, as LED technologies develop with the drive for energy efficiency and clean technologies worldwide, more families and organizations will adopt LED lighting for their illumination applications. In this trend, the potential safety concerns such as risk of electric shock and fire become especially important and need to be well addressed.

In today's retrofit applications of an LED lamp to replace an existing fluorescent lamp, consumers may choose either to adopt a ballast-compatible LED lamp with an existing ballast used to operate the fluorescent lamp or to employ an alternate current (AC) mains-operable LED lamp by removing/bypassing the ballast. Either application has its advantages and disadvantages. In the former case, although the ballast consumes extra power, it is straightforward to replace the fluorescent lamp without rewiring, which consumers have a first impression that it is the best alternative. But the fact is that total cost of ownership for this approach is high regardless of very low initial cost. For example, the ballast-compatible LED lamps work only with particular types of ballasts. If the existing ballast is not compatible with the ballast-compatible LED lamp, the consumer will have to replace the ballast. Some facilities built long time ago incorporate different types of fixtures, which requires extensive labor for both identifying ballasts and replacing incompatible ones. Moreover, a ballast-compatible LED lamp can operate longer than the ballast. When an old ballast fails, a new ballast will be needed to replace in order to keep the ballast-compatible LED lamps working. Maintenance will be complicated, sometimes for the lamps and sometimes for the ballasts. The incurred cost will preponderate over the initial cost savings by changeover to the ballast-compatible LED lamps for hundreds of fixtures throughout a facility. In addition, replacing a failed ballast requires a certified electrician. The labor costs and long-term maintenance costs will be unacceptable to end users. From energy saving point of view, a ballast constantly draws power, even when the ballast-compatible LED lamps are dead or not installed. In this sense, any energy saved while using the ballast-compatible LED lamps becomes meaningless with the constant energy use by the ballast. In the long run, the ballast-compatible LED lamps are more expensive and less efficient than self-sustaining AC mains-operable LED lamps.

On the contrary, an AC mains-operable LED lamp does not require a ballast to operate. Before use of the AC mains-operable LED lamp, the ballast in a fixture must be removed or bypassed. Removing or bypassing the ballast does not require an electrician and can be replaced by end users. Each AC mains-operable LED lamp is self-sustaining. Once installed, the AC mains-operable LED lamps will only need to be replaced after 50,000 hours. In view of above advantages and disadvantages of both the ballast-compatible LED lamps and the AC mains-operable LED lamps, it seems that market needs a most cost-effective solution by using a universal LED lamp that can be used with the AC mains and is compatible with a ballast so that LED lamp users can save an initial cost by changeover to such an LED lamp followed by retrofitting the lamp fixture to be used with the AC mains when the ballast dies.

Ballasts have several different types. However, in the US, electronic ballasts are most popular in lamp fixtures because they are more efficient and less expensive than other types of ballasts. Nevertheless, it is better for the ballast-compatible LED lamp to be compatible with either electronic ballasts or other types of ballasts.

As mentioned above, a cost-effective solution may be to use a ballast as part of an LED driver to operate a lamp. In some prior art schemes, a switching mode power supply (SMPS) type LED driver is proposed to use with a ballast, but has not been completely accepted due to occasional fires that arise inside the ballast. The cause of these fires has been identified to be a large direct-current (DC) input capacitor in the SMPS type LED driver, which may destroy a capacitor in the ballast due to excessive initial resonant voltage. A conventional SMPS type LED driver for AC mains comprises a Buck converter, which can efficiently convert input voltages of 110~277 VAC into a DC voltage required to power LEDs in an LED lamp. However, the ballast has an output voltage much higher than 277 VAC with a frequency well above 60 Hz. Such a Buck converter is controlled by a control logic, which has several drawbacks that limit its use in ballast applications. First, the control logic has a low operating voltage range which inherently limits the wide range of input voltages that can be used. Second, an over-voltage protection (OVP) function in the control logic starts at a low voltage limited by the low operating voltage. When an input voltage from a ballast exceeds a certain value, OVP functions to stop operation, shutting down the lamp. Third, the Buck converter operates in a continuous conduction mode, in which an input current fails to follow the input voltage, leading to a low power factor with the AC mains and turn-on or other operational failures with the ballast. Fourth, the control logic is solely powered by a voltage built up by an input capacitor with a small capacitance to meet a short start-up requirement. When the input voltage drops to the minimum operating voltage level, the control logic fails to operate and sends no signals to the switch, and the Buck converter stops to function until the input voltage level recovers, resulting in flickering. For an LED lamp operating solely with a ballast, the power and current control is basically via an impedance or output voltage control. In the former case, when input frequency changes, the impedance changes, altering an AC current to flow into the driving circuit. A ballast is, in practice, supposed to operate two or more lamps, and its output frequency of the ballast decreases as a load increases, meaning that the total power consumption does not linearly increase as the number of lamps used increases. In the worst case, an LED lamp that is designed for a group of three or four lamps in a fixture powered by a ballast may be burned out due to over-rated current flowing into the LED arrays in the lamp if only one of such a lamp is installed and operated for a long time in the fixture. For the latter case, the output voltage control approach may work with an electronic ballast but cannot be used in AC mains. In general, conventional LED drivers fail to work with a ballast and to properly operate an LED lamp at a regulated power, resulting in unstable lighting output. It goes without saying that the same LED drivers can flawlessly operate the LED lamp with the AC mains.

SUMMARY

A light-emitting diode (LED) lamp comprising a first full-wave rectifier, a ballast operation circuit, an LED driving circuit, one or more LED arrays, and an optocoupler, is used to replace a fluorescent tube or a conventional LED tube lamp in lamp fixture sockets wired to connect to either AC mains or a ballast. The ballast operation circuit comprising two frequency sensitive devices, a second full-wave rectifier, and two or more diodes connected in series, is configured to auto-select an input AC voltage to operate the LED lamp without ambiguity and risk of internal fire. When the input AC voltage is from the ballast, the optocoupler is enabled to disable the LED driving circuit whereas the one or more LED arrays are powered by the second full-wave rectifier. When the input AC voltage is from the AC mains, the optocoupler is disabled to maneuver the LED driving circuit whereas the one or more LED arrays are powered by the LED driving circuit, pre-powered by the first full-wave rectifier. The scheme can effectively reduce a risk of lamp damages due to misapplications.

In one embodiment, the LED lamp comprises at least two electrical conductors configured to connect to the lamp fixture sockets. The first full-wave rectifier is connected to the at least two electrical conductors and configured to convert an input AC voltage from the AC mains into a first DC voltage. The second full-wave rectifier in the ballast operation circuit is coupled in parallel with the first full-wave rectifier and configured to convert the input AC voltage from the ballast into a second DC voltage and to power the one or more LED arrays. The LED driving circuit comprises an input filter, a power sustaining device, a driver comprising a voltage feedback module and a low voltage input, and one or more start-up resistors connected in parallel with the voltage feedback module. The one or more start-up resistors and the voltage feedback module are configured to provide a low DC voltage to couple to the power sustaining device and to sustain operation of the LED driving circuit, wherein the LED driving circuit is configured to operate in response to the first DC voltage and to power the one or more LED arrays.

The optocoupler comprises an infrared emitting diode and a phototransistor and is configured to operate in response to the second DC voltage and to disable the LED driving circuit when enabled. The two or more diodes connected in series in the ballast operation circuit are connected between the LED Arrays and the second full-wave rectifier. When the input AC voltage is from the ballast, the two or more diodes connected in series build up a forward bias voltage across the infrared emitting diode in the optocoupler, operating the optocoupler. In other words, the forward bias voltage enables the infrared emitting diode to optically couple an "on" signal to the phototransistor, which is connected in series between a relatively high voltage potential and a relatively low voltage potential of the power sustaining device. The "on" signal coupled to the phototransistor results in electric current conduction, which pulls down the relatively high voltage potential of the power sustaining device to the relatively low voltage potential. Without power in the power sustaining device to sustain operation of the LED driving circuit, the LED driving circuit is disabled. The two or more diodes connected in series allow an electric current flow only in a direction from the one or more LED arrays to a low DC potential port of the second full-wave rectifier to ensure to build up the forward bias voltage higher than a forward voltage of the infrared emitting diode, thereby promoting a forward current flow in the infrared emitting diode while permitting different electrical potentials between the infrared emitting diode and the phototransistor. To improve lamp compatibility with various ballasts: instant-start, rapid-start, and program-start, the first full-wave rectifier and the input filter are so connected to form an electric current path configured to allow an initial current passing thereon and returning back to various ballasts so that the various ballasts can subsequently generate a high input AC voltage to operate the second full-wave rectifier and further to power the one or more LED arrays.

When the input AC voltage is from the AC mains, the second full-wave rectifier receives no power. The ballast operation circuit auto-selects to disable the optocoupler whereas the LED driving circuit receives power from the first full-wave rectifier without intervention by the optocoupler and operates to power the one or more LED arrays.

The LED driving circuit may comprise an input filter, one or more start-up resistors, a power sustaining device, and a driver enabled by the power sustaining device to power the one or more LED arrays. The driver may comprise a high voltage input configured to receive a filtered DC voltage from the input filter, a power factor correction (PFC) and control device not compatible to ballasts, a switch controlled by the PFC and control device, a current sensing resistor, a first diode, a second diode, an inductor with current charging and discharging controlled by the switch and the first diode, and an output capacitor connected to the inductor to build up an output voltage and to power the one or more LED arrays via the second diode, wherein the voltage feedback module is coupled to draw partial power from the output voltage to pump energy in the power sustaining device and to sustain an operation of the PFC and control device, and wherein, responsive to detecting zero current in the inductor within an AC cycle of the input voltage, the PFC and control device generates a zero current detection signal to control the switch turning on and off. That is, when the input AC voltage is from the AC mains, the LED driving circuit receives power from the first full-wave rectifier and operates normally to drive the one or more LED arrays. When the input AC voltage is from the ballast, the ballast operation circuit operates to drive the one or more LED arrays while the LED driving circuit is disabled to achieve wider compatibility to the various ballasts.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION OF THE INVENTION

Figure 1:
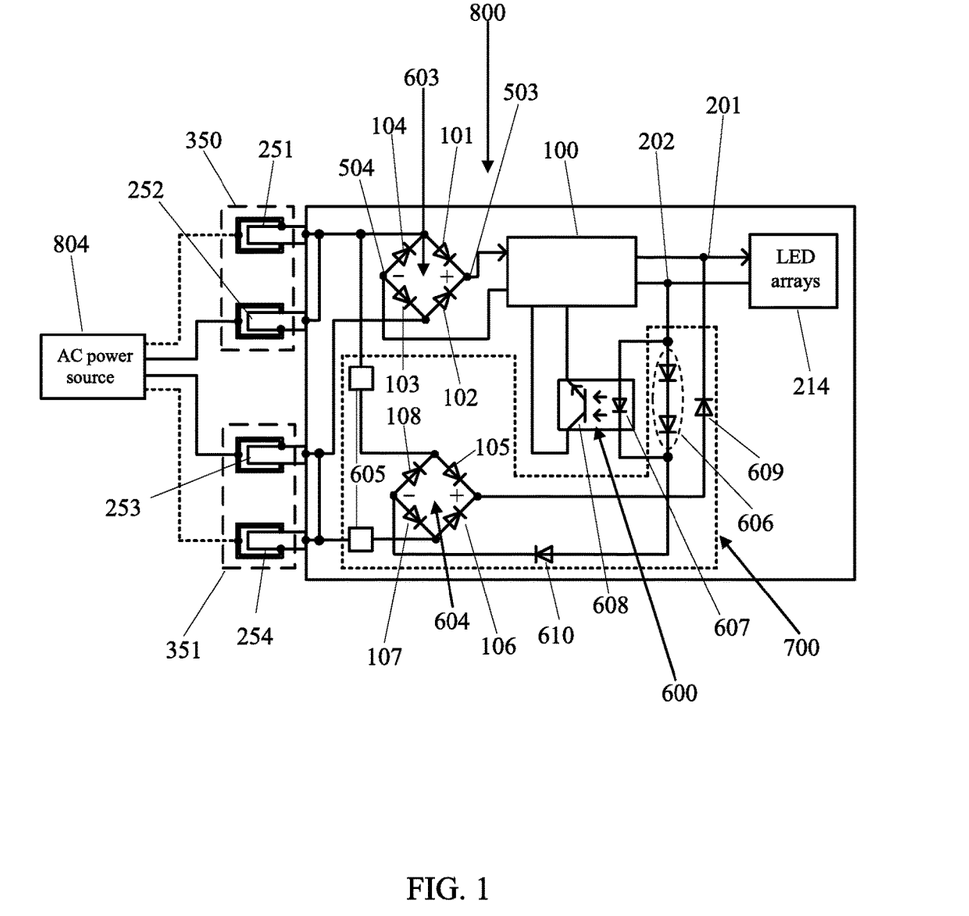
FIG. 1 is a block diagram of an LED lamp operable with AC power sources that include AC mains and ballasts according to the present disclosure.

FIG. 1 is a block diagram of an LED lamp 800 operable with AC power sources that include AC mains and ballasts according to the present disclosure. The LED lamp 800 comprises one or more LED arrays 214; a lamp base portion comprising electrical conductors 251, 252, 253, and 254; a first full-wave rectifier 603; an optocoupler 600; a ballast operation circuit 700; and an LED driving circuit 100. The ballast operation circuit 700 comprises and a second full-wave rectifier 604, two frequency sensitive devices 605, and two or more diodes 606 connected in series. The first full-wave rectifier 603 receives power from an AC power source 804 via the four electrical conductors 251, 252, 253, and 254 and converts an AC voltage into a first DC voltage. The AC power source 804 may be a ballast or the AC mains. The electrical conductors 251 and 252 connect to a fixture socket 350, and the electrical conductors 253 and 254 connect to the other fixture socket 351. The LED driving circuit 100 is connected to the first full-wave rectifier 603 through two interconnecting ports 503 and 504. The first full-wave rectifier 603 comprises four diodes, 101, 102, 103, and 104 while the second full-wave rectifier 604 comprises four diodes, 105, 106, 107, and 108. In the first full-wave rectifier 603, the four diodes 101-104 are interconnected with four input/output ports. Similarly, in the second full-wave rectifier 604, the four diodes 105-108 are interconnected with four input/output ports. The second full-wave rectifier 604 is coupled to the first full-wave rectifier 603 in parallel via the two frequency sensitive devices 605 at two AC input ports. Not like prior art, only the first full-wave rectifiers 603 is connected to the LED driver 100 such that the positive and the negative input/output ports 503 and 504 of the first full-wave rectifier 603 are electrically isolated from the positive and the negative input/output ports of the second full-wave rectifier 604. The high electric potential at the input/output port 503 and the low electric potential at the input/output port 504 then respectively connect to the high side and the low side of the LED driving circuit 100 with the low electric potential port 504 as a common ground. As a result, the two full-wave rectifiers 603 and 604 independently perform a full-wave rectification of an AC voltage from the ballast and the AC mains according to wiring configuration in the lamp fixture. A diode conducts an electric current if it is forward biased but blocks a current flow if it is reversed biased. Taking advantage of this property, each diode in the full-wave rectifiers 603 and 604 can sense an electric potential difference between its two ports and can convert an AC voltage to a DC voltage if an AC voltage is applied to a circuit with a diode connected in a proper manner. With the eight diodes 101-108 and two or more diodes connected in series configured in the present disclosure, the two full-wave rectifiers 603 and 604 and two or more diodes 606 connected in series can control the electric current flowing into and returning from the one or more LED arrays 214, thus completing a power transfer to the one or more LED arrays 214, no matter whether the AC power is from the ballasts or the AC mains.

In FIG. 1, when the four electrical conductors 251, 252, 253, and 254 of the LED lamp 800 are installed in the fixture sockets 350 and 351, a high AC voltage from the AC power source 804 may appear between a pair of the electrical conductors such as, for example, 251 and 253, 251 and 254, 252 and 253, or 252 and 254. For the first case, assume that the high AC voltage from the AC mains appears between the electrical conductors 251 and 253. The diode 101 in the full-wave rectifier 603 detects an electric current path and conducts a positive cycle of an electric current from the electrical conductors 251, the diode 101, and the input/output port 503 to the LED driving circuit 100, continuing to the one or more LED arrays 214 through a port 201, returning from the one or more LED arrays 214 through a port 202, the LED driving circuit 100, the input/output port 504, and the diode 108 to the electrical conductor 253, thus delivering a power to the one or more LED arrays 214. When the input AC voltage is from the AC mains, the second full-wave rectifier 604 receives little power from the AC mains because the two frequency sensitive devices 605 block a 60 Hz current flow from the AC mains. In this case, the LED driving circuit 100 receives DC power from the first full-wave rectifier 603 and powers the one or more LED arrays 214, leaving the ballast operation circuit 700 completely disabled.

When the input AC voltage is from the ballast, the second full-wave rectifier 604 receives power from the ballast via the two frequency sensitive devices 605 which present a low impedance in responding to a high frequency (i.e. 40~65 kHz) input voltage from the ballast. In this case, a DC current from the second full-wave rectifier 604 goes through a diode 609 to the one or more LED arrays 214. The current returned from the one or more LED arrays 214 goes through the two or more diodes 606 connected in series and a diode 610 along a path back to the second full-wave rectifier 604, further flowing to the ballast via the frequency sensitive device 605, completing a power transfer to the one or more LED arrays 214.

The optocoupler 600 comprises an infrared emitting diode 607 and a phototransistor 608 and is configured to operate in response to the second DC voltage and to disable the LED driving circuit 100 when enabled. The two or more diodes connected in series in the ballast operation circuit 700 are connected in parallel with infrared emitting diode 607 with anodes connected together. When the input AC voltage is from the ballast, the current returned from the one or more LED arrays 214 build up a forward bias voltage across the two or more diodes 606 connected in series. The infrared emitting diode 607 in the optocoupler 600 is thus activated to optically couple an "on" signal to the phototransistor 608, controlling the LED driving circuit 100 not to operate. The two or more diodes 606 connected in series allow an electric current flow only in a direction from the one or more LED arrays 214 to a low DC potential port of the second full-wave rectifier 604 to ensure to build up the forward bias voltage higher than a forward voltage of the infrared emitting diode 607, thereby promoting a forward current flow in the infrared emitting diode 607 while permitting different potentials between the infrared emitting diode 607 and the phototransistor 608.

Similarly for other possible cases, the two full-wave rectifiers 603 and 604 can always find a correct path for an electric current to flow into and from the one or more LED arrays 214, thus delivering power to the one or more LED arrays 214. This means that when such an LED lamp 800 is installed in the fixture, the two full-wave rectifiers 603 and 604 can detect at which ports an input voltage is applied and make proper current path so that the LED lamp 800 can operate without operational uncertainty with the existing AC power source no matter whether the AC power source has two or four output ports. As mentioned above, the designs of two full-wave rectifiers 603 and 604 and two frequency sensitive devices that have the low impedance at a high frequency such as 45 kHz for using with a ballast and a high impedance at 60 Hz are critical to operate the LED lamp 800 and prevent a internal fire from occurring.

Figure 2:
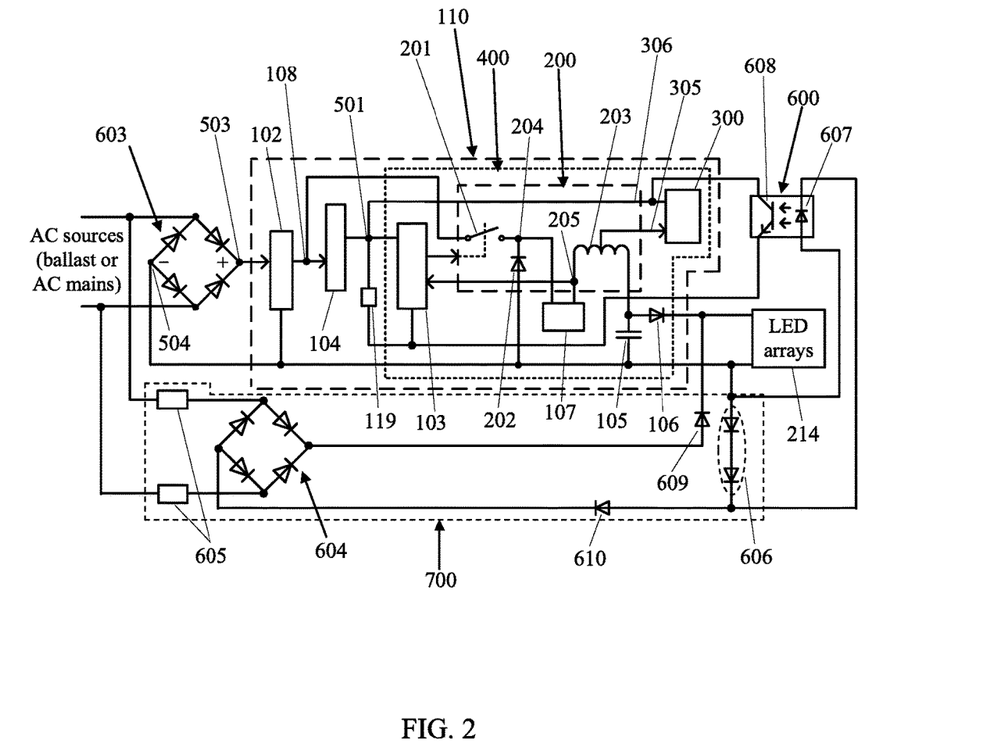
FIG. 2 is one embodiment of a combined LED driving circuit used in an LED lamp operable with either the AC mains or ballasts according to the present disclosure.

FIG. 2 is one embodiment of a combined LED driving circuit used in an LED lamp operable with either the AC mains or ballasts according to the present disclosure. In FIG. 2, the same numerals are used for the same components as in FIG. 1. The combined LED driving circuit comprises an LED driving circuit 110 operated only with line voltage from the AC mains, and a ballast operation circuit 700 operated only with input voltage from the ballasts. A full-wave rectifier 603 connecting to an AC source, either the AC mains or the ballast, converts an AC voltage into a DC voltage. The LED driving circuit 110, connecting to the full-wave rectifier 603, comprises an input filter 102 used to filter the input voltage and to suppress EMI noise created in the LED driving circuit 110, one or more start-up resistors 104, a power sustaining device 119, and a driver 400. The driver 400 comprises a power factor correction (PFC) and control device 103, a Buck converter 200 in communicating with the PFC and control device 103, an output capacitor 105 connected to the Buck converter 200 to build up an output voltage and to power the one or more LED arrays 214, a current sensing resistor 107, a diode 106 to control an output current to flow into the one or more LED arrays 214, and a voltage feedback module 300 extracting partial energy from the output voltage to pump energy in the power sustaining device 119 and to sustain the PFC and control device 103. The driver 400 has a high voltage input port 108 and a low voltage input port 501. The power sustaining device 119 is configured to provide a low DC voltage operating the PFC and control device 103. When the low DC voltage provided by the power sustaining device 119 is depleted, the PFC and control device 103 stops to work, so as the driver 400. The full-wave rectifier 603 has four input/output ports, among which a high electric potential appears at the input/output port 503 as V+, and a low electric potential appears at the input/output port 504 as V−, respectively connecting to the high side and the low side of the input filter 102 with the low electric potential port 504 as a common ground. The Buck converter 200 comprises a switch 201 controlled by the PFC and control device 103, a diode 202, and an inductor 203 with its current charging and discharging controlled by the switch 201 and the diode 202. When the low DC voltage from the power sustaining device 119 applies to the PFC and control device 103, the driver 400 sustains its operation, in which the driver 400 can detect zero current in the inductor 203 within an AC cycle of an input voltage generating a zero current detection signal and controls the switch 201 on and off with a constant on-time and a varied off-time controlled by the zero current detection signal. By adapting switching frequencies, switching on-time and switching off-time, the PFC and control device 103 controls the switch 201 on and off in a way that the inductor 203 is charged during the switching on-time and discharged during the switching off-time, and that a desired output voltage $V_o$ across the one or more LED arrays 214 is reached to light up the one or more LED arrays 214. The average inductor current is thus equal to the output current that flows into the one or more LED arrays 214. When the switch 201 is on, the diode 202 is reverse-biased, and an input current flows from an output port 108 in the input filter 102, the switch 201, the first port 204 of the current sensing resistor 107, the current sensing resistor 107 itself, and the second port 205 of the current sensing resistor 107, into the inductor 203. When the current flowing into the inductor 203 increases, the voltage across the current sensing resistor 107 increases. The second port 205 of the current sensing resistor 107 connects with the PFC and control device 103, which continuously receives signals and adjusts the switching off-time such that the output voltage and current to the one or more LED arrays 214 are regulated to meet the output requirements. The output capacitor 105 connecting to the inductor 203 receives energy to build up an output voltage and to conduct a current via the diode 106 to power the one or more LED arrays 214.

The inductor 203 configured as an autotransformer has a center-tapped port connecting to the voltage feedback module 300 comprising a diode. The voltage feedback module 300 has two connection ports 305 and 306, with the first connection port 305 connecting to the center-tapped port of center-tapped inductor 203 and with the second connection port 306 connecting to the PFC and control device 103. The PFC and control device 103 is powered by the power sustaining device 119 with a voltage built up to supply an internal logic control circuit (not shown) in the PFC and control device 103. When the voltage decreases due to its increased internal operations and controls, and when the voltage at the center-tapped port of the inductor 203 is higher than the supplying voltage, the diode in the voltage feedback module 300 conducts to supply a current to the PFC and control device 103 and sustain its operations. The function of the voltage feedback module 300 is essential for sustaining operation of the LED driving circuit 110. In other words, the power sustaining device 119 must provide with sufficient power to the PFC and control device 103 to meet requirements of start-up time and current without turn-on failure and flickering when operating the LED lamp 800. The voltage feedback module 300 is thus needed to pump energy in the power sustaining device 119 in time and to sustain the operating voltage. Once the driver 400 is operated, it extracts partial power from the output voltage to pour into the power sustaining device 119 to maintain its operation while a low DC voltage from the one or more start-up resistors 104 continuously applies to the power sustaining device 119. In this sense, the power sustaining device 119 receives power from not only the one or more start-up resistors 104 but also the voltage feedback module 300.

When the input AC voltage is from the AC mains, the second full-wave rectifier 604 receives little power from the AC mains because the two frequency sensitive devices 605 block a 60 Hz current flow from the AC mains. In this case, the LED driving circuit 110 receives DC power from the first full-wave rectifier 603 and powers the one or more LED arrays 214, leaving the ballast operation circuit 700 completely disabled. However, when the input AC voltage is from the ballast, the second full-wave rectifier 604 receives power from the ballast via the two frequency sensitive devices 605 which present a low impedance in responding to a high frequency (i.e. 40~65 kHz) input voltage from the ballast. In this case, a DC current from the second full-wave rectifier 604 goes through the diode 609 to the one or more LED arrays 214. The current returned from the one or more LED arrays 214 goes through the two or more diodes 606 connected in series and a diode 610 along a path back to the second full-wave rectifier 604, further flowing to the ballast via the frequency sensitive device 605, completing a power transfer to the one or more LED arrays 214.

Same as in FIG. 1, the optocoupler 600 comprises an infrared emitting diode 607 and a phototransistor 608 and configured to operate in response to the second DC voltage and to disable the LED driving circuit 100 when enabled. The two or more diodes connected in series in the ballast operation circuit 700 are connected in parallel with infrared emitting diode 607 with anodes connected together. When the input AC voltage is from the ballast, the current returned from the one or more LED arrays 214 build up a forward bias voltage across the two or more diodes 606 connected in series. The infrared emitting diode 607 in the optocoupler 600 is thus activated to optically couple an "on" signal to the phototransistor 608, controlling the LED driving circuit 110 not to operate. The two or more diodes 606 connected in series allow an electric current flow only in a direction from the one or more LED arrays 214 to a low DC potential port of the second full-wave rectifier 604 to ensure to build up the forward bias voltage higher than a forward voltage of the infrared emitting diode 607, thereby promoting a forward current flow in the infrared emitting diode 607 while permitting different potentials between the infrared emitting diode 607 and the phototransistor 608. The phototransistor 608 is connected in series between a relatively high voltage potential port (i.e. port 306 of the voltage feedback module 300) and a relatively low voltage potential port of the power sustaining device 119. When the infrared emitting diode 607 is forward biased, the current flowing across it enables the infrared emitting diode 607 to optically couple to the phototransistor 608, consequently pulling down the relatively high voltage potential of the power sustaining device to a relatively low voltage potential, thereby disabling the LED driving circuit 110.

Figure 3:
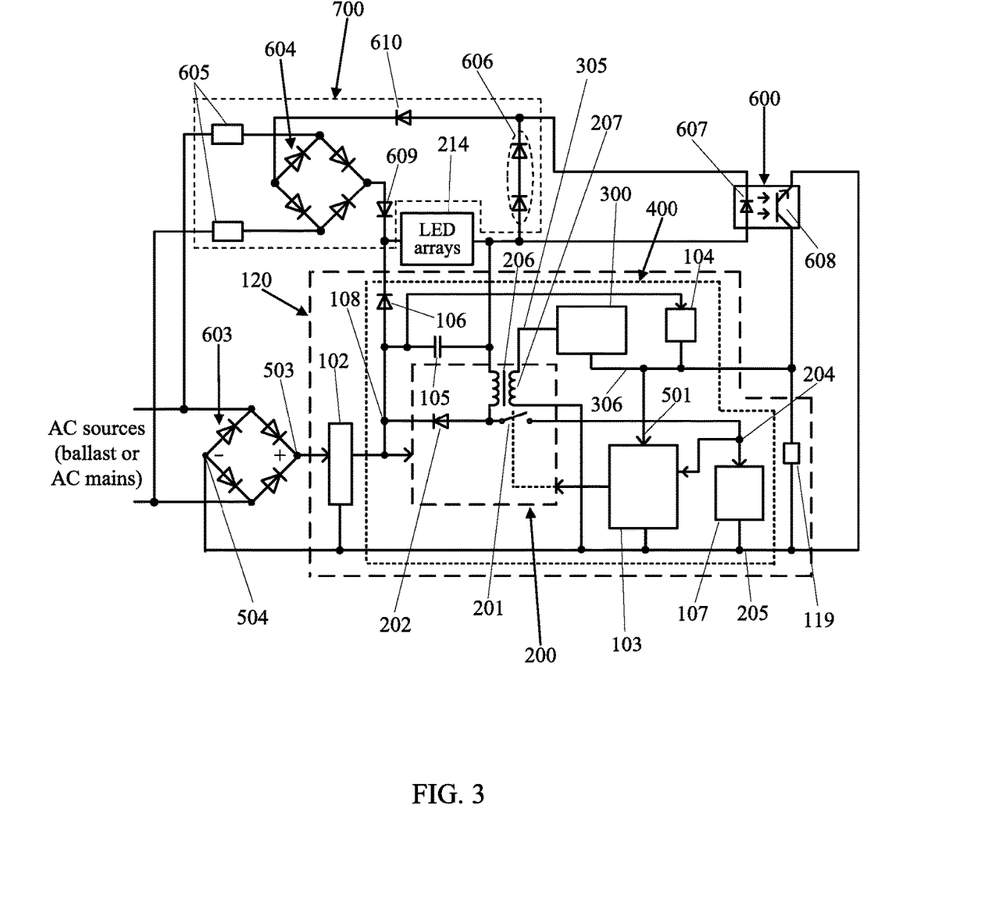
FIG. 3 is another embodiment of a combined LED driving circuit used in an LED lamp operable with either the AC mains or ballasts according to the present disclosure.

FIG. 3 is another embodiment of a combined LED driving circuit used in an LED lamp operable with either the AC mains or the ballasts according to the present disclosure. The combined LED driving circuit comprises an LED driving circuit 120 operated only with line voltage from the AC mains, and a ballast operation circuit 700 operated only with input voltage from the ballasts. The LED driving circuit 120 in FIG. 3 has all the components as the LED driving circuit 110 in FIG. 2, except that interconnections are different, and a transformer 206 in FIG. 3 replaces the center-tapped inductor 203 in FIG. 2. In FIG. 3, the same numerals are used for the same components as in FIG. 2. In FIG. 3, the LED driving circuit 120, connecting to the full-wave rectifier 603, comprises an input filter 102, one or more start-up resistors 104, and a driver 400. The driver 400 comprises a power factor correction (PFC) and control device 103, a Buck converter 200 in communicating with the PFC and control device 103, an output capacitor 105 connected to the Buck converter 200 to build up an output voltage and to power the one or more LED arrays 214, a current sensing resistor 107, a diode 106 to control an output current to flow into the one or more LED arrays 214, and a voltage feedback module 300 extracting partial energy from the output voltage to sustain the PFC and control device 103. The driver 400 has a high voltage input port 108 and a low voltage input port 501. The power sustaining device 119 is configured to provide a low DC voltage operating the PFC and control device 103. When the low DC voltage provided by the power sustaining device 119 is depleted, the PFC and control device 103 stops to work, so as the driver 400. The full-wave rectifier 603 has four input/output ports, among which a high electric potential appears at the input/output port 503 as V+, and a low electric potential appears at the input/output port 504 as V−, respectively connecting to the high side and the low side of the input filter 102 with the low electric potential port 504 as a common ground. The Buck converter 200 comprises a switch 201 controlled by the PFC and control device 103, a diode 202, and an inductor 203 with its current charging and discharging controlled by the switch 201. When the low DC voltage from the power sustaining device 119 applies to the PFC and control device 103, the driver 400 sustains its operation, in which the driver 400 can detect zero current in the inductor 203 within an AC cycle of an input voltage generating a zero current detection signal and controls the switch 201 on and off with a constant on-time and a varied off-time controlled by the zero current detection signal. By adapting switching frequencies, switching on-time and switching off-time, the PFC and control device 103 controls the switch 201 on and off in a way that the inductor 203 is charged during the switching on-time and discharged during the switching off-time, and that a desired output voltage $V_o$ across the one or more LED arrays 214 is reached to light up the one or more LED arrays 214. The average inductor current is thus equal to the output current that flows into the one or more LED arrays 214. When the switch 201 is on, the diode 202 is reverse-biased, and an input current flows from an output port 108 in the input filter 102, the switch 201, the first port 204 of the current sensing resistor 107, the current sensing resistor 107 itself, and the second port 205 of the current sensing resistor 107, into the inductor 203. When the current flowing into the inductor 203 increases, the voltage across the current sensing resistor 107 increases. The second port 205 of the current sensing resistor 107 connecting with the PFC and control device 103 continuously receives signals and adjusts the switching off-time such that the output voltage and current to the one or more LED arrays 214 are regulated to meet the output requirements. The output capacitor 105 connecting to the inductor 203 receives energy to build up an output voltage and to conduct a current via the diode 106 to power the one or more LED arrays 214.

A second winding 207 of the transformer 206 is connected to the voltage feedback module 300 comprising a diode. The voltage feedback module 300 has two connection ports 305 and 306, with the first connection port 305 connecting to second winding 207 of the transformer 206 and with the second connection port 306 connecting to the PFC and control device 103. The PFC and control device 103 is powered by the power sustaining device 119 with a voltage built up to supply an internal logic control circuit (not shown) in the PFC and control device 103. When the voltage decreases due to its increased internal operations and controls, and when the voltage at the second winding 207 of the transformer 206 is higher than the supplying voltage, the diode in the voltage feedback module 300 conducts to supply a current to the PFC and control device 103 and sustain its operations. The function of the voltage feedback module 300 is essential for sustaining operation of the LED driving circuit 120. In other words, the power sustaining device 119 must provide with sufficient power to the PFC and control device 103 to meet requirements of start-up time and current without turn-on failure and flickering when operating the LED lamp. The voltage feedback module 300 is thus needed to pump in energy in the power sustaining device 119 in time and to sustain the operating voltage. Once the driver 400 is operated, it extracts partial power from the output voltage to pour into the power sustaining device 119 to maintain its operation while the first low DC voltage from the one or more start-up resistors 104 continuously applies to the power sustaining device 119. In this sense, the power sustaining device 119 receives power from not only the one or more start-up resistors 104 but also the voltage feedback module 300.

When the input AC voltage is from the AC mains, the second full-wave rectifier 604 receives little power from the AC mains because the two frequency sensitive devices 605 block a 60 Hz current flow from the AC mains. In this case, the LED driving circuit 120 receives DC power from the first full-wave rectifier 603 and powers the one or more LED arrays 214, leaving the ballast operation circuit 700 completely disabled. However, when the input AC voltage is from the ballast, the second full-wave rectifier 604 receives power from the ballast via the two frequency sensitive devices 605 which present a low impedance in responding to a high frequency (i.e. 40~65 kHz) input voltage from the ballast. In this case, a DC current from the second full-wave rectifier 604 go through the diode 609 to the one or more LED arrays 214. The current returned from the one or more LED arrays 214 goes through the two or more forward biased diodes 606 and a diode 610 along a path back to the second full-wave rectifier 604, further flowing to the ballast via the frequency sensitive device 605, completing a power transfer to the one or more LED arrays 214.

Same as in FIG. 2, the optocoupler 600 comprises an infrared emitting diode 607 and a phototransistor 608 and configured to operate in response to the second DC voltage and to disable the LED driving circuit 120 when enabled. The two or more forward biased diodes in the ballast operation circuit 700 are connected in parallel with infrared emitting diode 607 with anodes connected together. When the input AC voltage is from the ballast, the current returned from the one or more LED arrays 214 build up a forward bias voltage across the two or more forward biased diodes 606. The infrared emitting diode 607 in the optocoupler 600 is thus activated to optically couple an "on" signal to the phototransistor 608, controlling the LED driving circuit 120 not to operate. The two or more forward biased diodes 606 allow an electric current flow only in a direction from the one or more LED arrays 214 to a low DC potential port of the second full-wave rectifier 604 to ensure to build up the forward bias voltage higher than a forward voltage of the infrared emitting diode 607, thereby promoting a forward current flow in the infrared emitting diode 607 while permitting different potentials between the infrared emitting diode 607 and the phototransistor 608. The phototransistor 608 is connected in series between a relatively high voltage potential port (i.e. port 306 of the voltage feedback module 300) and a relatively low voltage potential port of the power sustaining device 119. When the infrared emitting diode 607 is forward biased, the current flowing across it enables the infrared emitting diode 607 to optically couple to the phototransistor 608, consequently pulling down the relatively high voltage potential of the power sustaining device to a relatively low voltage potential, thereby disabling the LED driving circuit 120.

Figure 4:
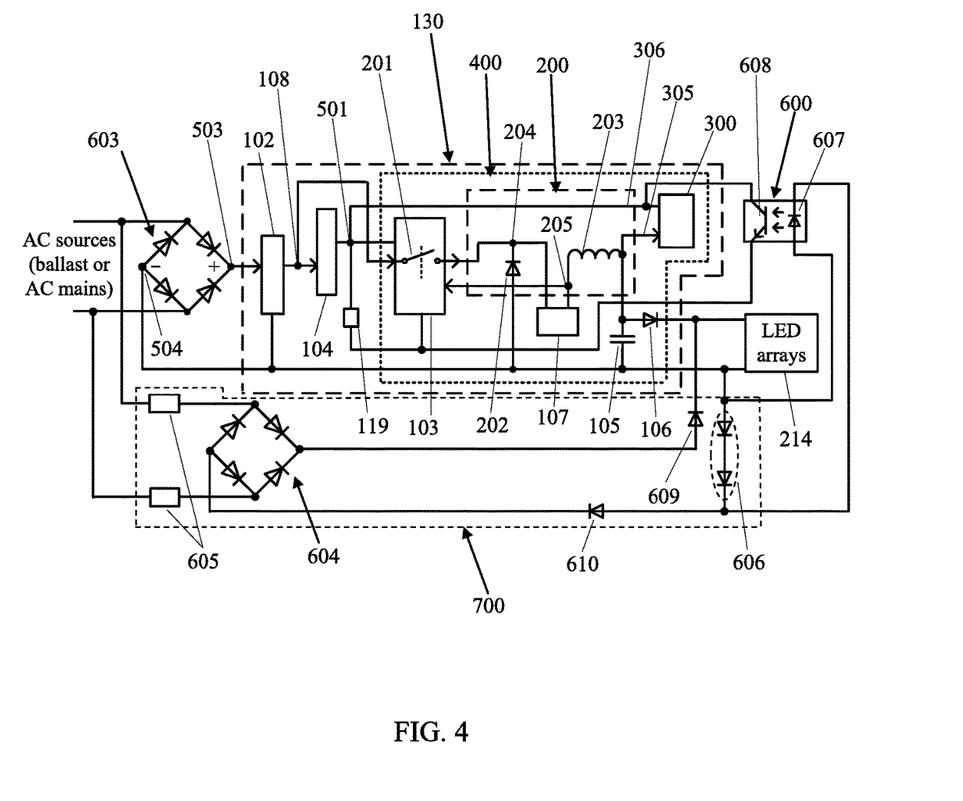
FIG. 4 is another embodiment of a combined LED driving circuit similar to FIG. 2 according to the present disclosure.

FIG. 4 is another embodiment of a combined LED driving circuit similar to FIG. 2 according to the present disclosure. The combined LED driving circuit comprises an LED driving circuit 130 operated only with line voltage from the AC mains, and a ballast operation circuit 700 operated only with input voltage from the ballasts. The LED driving circuit 130 in FIG. 4 has all the components as the LED driving circuit 110 in FIG. 2, except that the switch 201 is integrated in the PFC and control device 103, and an inductor 208 in FIG. 4 replaces the center-tapped inductor 203 in FIG. 2. In FIG. 4, the same numerals are used for the same components as in FIG. 2. Similar to FIG. 2, a full-wave rectifier 603 connecting to an AC source, either the AC mains or the ballast, converts an AC voltage into a DC voltage. An LED driving circuit 130, connecting to the full-wave rectifier 603, comprises an input filter 102 used to filter the input voltage and to suppress EMI noise created in the LED driving circuit 130, one or more start-up resistors 104, a power sustaining device 119, a driver 400. The driver 400 comprises a power factor correction (PFC) and control device 103 comprising an internal logic control circuit (not shown) and the switch 201 controlled by the internal logic control circuit, a Buck converter 200 in communicating with the PFC and control device 103, an output capacitor 105 in parallel with a resistor 106 connected to the Buck converter 200 to build up an output voltage and to power the one or more LED arrays 214, a current sensing resistor 107, and a voltage feedback module 300 extracting partial energy from the output voltage to sustain the PFC and control device 103. The driver 400 has a high voltage input port 108 and a low voltage input port 501. The power sustaining device 119 is configured to provide a low DC voltage to operate the PFC and control device 103. When the low DC voltage provided by the power sustaining device 119 is depleted, the PFC and control device 103 stops to work, so as the driver 400. The full-wave rectifier 603 has four input/output ports, among which a high electric potential appears at the input/output port 503 as V+, and a low electric potential appears at the input/output port 504 as V−, respectively connecting to the high side and the low side of the input filter 102 with the low electric potential port 504 as a common ground. The Buck converter 200 comprises a diode 202, and an inductor 203 with its current charging and discharging controlled by the switch 201 in the PFC and control device 103. When the low DC voltage from the power sustaining device 119 applies to the PFC and control device 103, the driver 400 sustains its operation, in which the driver 400 can detect zero current in the inductor 203 within an AC cycle of an input voltage generating a zero current detection signal and controls the switch 201 on and off with a constant on-time and a varied off-time controlled by the zero current detection signal. By adapting switching frequencies, switching on-time and switching off-time, the PFC and control device 103 controls the switch 201 on and off in a way that the inductor 203 is charged during the switching on-time and discharged during the switching off-time, and that a desired output voltage $V_o$ across the one or more LED arrays 214 is reached to light up the one or more LED arrays 214. The average inductor current is thus equal to the output current that flows into the one or more LED arrays 214. When the switch 201 is on, the diode 202 is reverse-biased, and an input current flows from an output port 108 in the input filter 102, the switch 201, the first port 204 of the current sensing resistor 107, the current sensing resistor 107 itself, and the second port 205 of the current sensing resistor 107, into the inductor 203. When the current flowing into the inductor 203 increases, the voltage across the current sensing resistor 107 increases. The second port 205 of the current sensing resistor 107 connects with the PFC and control device 103, which continuously receives signals and adjusts the off-time such that the output voltage and current to the one or more LED arrays 214 are regulated to meet the output requirements. The output capacitor 105 connects to the inductor 203, receiving energy to build up an output voltage and to conduct a current via the diode 106 to power the one or more LED arrays 214.

The PFC and control device 103 is powered by the power sustaining device 119 with a voltage built up to supply an internal logic control circuit (not shown) in the PFC and control device 103. When the voltage decreases due to its increased internal operations and controls, and when the voltage at the inductor 203 is higher than the supplying voltage, the diode in the voltage feedback module 300 conducts to supply a current to the PFC and control device 103 and sustain its operations. The function of the voltage feedback module 300 is essential for sustaining operation of the LED driving circuit 130. In other words, the power sustaining device 119 must provide with sufficient power to the PFC and control device 103 to meet requirements of start-up time and current without turn-on failure and flickering when operating the LED lamp. The voltage feedback module 300 is thus needed to pump in energy in the power sustaining device 119 in time and to sustain the operating voltage. Once the driver 400 is operated, it extracts partial power from the output voltage to pour into the power sustaining device 119 to maintain its operation while the low DC voltage from the one or more start-up resistors 104 continuously applies to the power sustaining device 119. Same as in FIGS. 2-3, when power in the power sustaining device 119 is depleted, the LED driving circuit 130 will be disabled to operate. In FIG. 4, the built-in switch may comprise a metal-oxide-semiconductor field-effect transistor (MOSFET). In FIGS. 2-3, the switch may comprise a MOSFET, a transistor, or a combination thereof.

Whereas preferred embodiments of the present disclosure have been shown and described, it will be realized that alterations, modifications, and improvements may be made thereto without departing from the scope of the following claims. Another kind of the AC mains and ballast compatible schemes adopted in an LED-based lamp using various kinds of combinations to accomplish the same or different objectives could be easily adapted for use from the present disclosure. Accordingly, the foregoing descriptions and attached drawings are by way of example only, and are not intended to be limiting.

What is claimed is:

1. A light-emitting diode (LED) lamp, comprising:
    at least two electrical conductors configured to connect to lamp fixture sockets wired to connect to either alternate current (AC) mains or a ballast;
    one or more LED arrays;
    a first full-wave rectifier connected to the at least two electrical conductors and configured to convert an input AC voltage from the AC mains into a first direct current (DC) voltage;
    a ballast operation circuit comprising a second full-wave rectifier coupled in parallel with the first full-wave rectifier receiving the input AC voltage, the second full-wave rectifier configured to convert an input AC voltage from the ballast into a second DC voltage and to power the one or more LED arrays;
    an LED driving circuit comprising an input filter, a power sustaining device, a driver comprising a voltage feedback module and a low voltage input, and one or more start-up resistors connected in parallel with the voltage feedback module, the one or more start-up resistors and the voltage feedback module configured to provide a low DC voltage to couple to the power sustaining device and to sustain operation of the LED driving circuit, wherein the LED driving circuit is configured to operate in response to the first DC voltage and to power the one or more LED arrays; and
    an optocoupler comprising an infrared emitting diode and a phototransistor, the optocoupler configured to operate in response to the second DC voltage and to disable the LED driving circuit when enabled,
    wherein:
    the ballast operation circuit, the optocoupler, and the LED driving circuit are configured to auto-select the input AC voltage from either the AC mains or the ballast to operate the one or more LED arrays without ambiguity and risk of internal fire.

2. The LED lamp of claim 1, wherein the ballast operation circuit further comprises one or more frequency sensitive devices connected in each of two inputs of the second full-wave rectifier and configured to auto-select the input AC voltage from the ballast.

3. The LED lamp of claim 1, wherein when the input AC voltage is from the ballast, the optocoupler is enabled to disable the LED driving circuit whereas the one or more LED arrays are powered by the second full-wave rectifier.

4. The LED lamp of claim 1, wherein the ballast operation circuit further comprises two or more diodes connected in series, connected between the one or more LED arrays and the second full-wave rectifier, and wherein when the input AC voltage is from the ballast, the two or more diodes connected in series build up a forward bias voltage to operate the optocoupler.

5. The LED lamp of claim 4, wherein the infrared emitting diode is connected in parallel with the two or more diodes connected in series in such a way that the forward bias voltage enables the infrared emitting diode to optically couple to the phototransistor, consequently pulling down a relatively high voltage potential of the power sustaining device to a relatively low voltage potential, thereby disabling the LED driving circuit.

6. The LED lamp of claim 4, wherein the two or more diodes connected in series allow an electric current flow only in a direction from the one or more LED arrays to a low DC potential port of the second full-wave rectifier so as to build up the forward bias voltage higher than a forward voltage of the infrared emitting diode, thereby promoting a forward current flow in the infrared emitting diode while permitting different electrical potentials between the infrared emitting diode and the phototransistor.

7. The LED lamp of claim 1, wherein when the input AC voltage is from the ballast, the first full-wave rectifier and the input filter are connected to form an electric current path configured to allow an initial current passing through and returning back to the ballast so that the ballast can subsequently generate a high input AC voltage to operate the one or more LED arrays, thus improving lamp compatibility with the ballast.

8. The LED lamp of claim 1, wherein when the input AC voltage is from the AC mains, the ballast operation circuit auto-selects to disable the optocoupler whereas the one or more LED arrays are operated by the LED driving circuit, pre-powered by the first full-wave rectifier.

9. The LED lamp of claim 1, wherein the voltage feedback module comprises a diode configured to direct a current flowing into the power sustaining device.

10. The LED lamp of claim 1, wherein the driver further comprises a high voltage input configured to receive a filtered DC voltage from the input filter, a power factor correction (PFC) and control device, a switch controlled by the PFC and control device, a current sensing resistor, a first diode, a second diode, an inductor with current charging and discharging controlled by the switch and the first diode, and an output capacitor connected to the inductor to build up an output voltage and to power the one or more LED arrays via the second diode, wherein the voltage feedback module is coupled to draw partial power from the output voltage to pump energy in the power sustaining device and to sustain an operation of the PFC and control device, and wherein, responsive to detecting zero current in the inductor within an AC cycle of the input voltage, the PFC and control device generates a zero current detection signal to control the switch turning on and off.

11. The LED lamp of claim 10, wherein the switch comprises a metal-oxide-semiconductor field-effect transistor (MOSFET), a transistor, or a combination thereof.

12. The LED lamp of claim 10, wherein the inductor in the driver comprises an autotransformer.

13. The LED lamp of claim 10, wherein the inductor in the driver is part of a transformer.

14. The LED lamp of claim 1, wherein the driver further comprises a high voltage input configured to receive a filtered DC voltage from the input filter, a power factor correction (PFC) and control device comprising an internal logic control circuit and a built-in switch controlled by the internal logic control circuit, a current sensing resistor, a first diode, a second diode, an inductor with current charging and discharging controlled by the built-in switch and the first diode, and an output capacitor connected to the inductor to build up an output voltage and to power the one or more LED arrays via the second diode, wherein the voltage feedback module is coupled to draw partial power from the output voltage to pump energy in the power sustaining device and to sustain an operation of the PFC and control device, and wherein, responsive to detecting zero current in the inductor within an AC cycle of the input voltage, the PFC and control device generates a zero current detection signal to control the built-in switch turning on and off.

15. The LED lamp of claim 14, wherein the built-in switch comprises a metal-oxide-semiconductor field-effect transistor (MOSFET).

* * * * *